(12) United States Patent
Slupik et al.

(10) Patent No.: US 10,389,149 B2
(45) Date of Patent: Aug. 20, 2019

(54) SENSORY AND CONTROL PLATFORM FOR AN AUTOMATION SYSTEM

(71) Applicant: Silvair Sp. z o.o., Cracow (PL)

(72) Inventors: Szymon Slupik, Cracow (PL); Adam Gembala, Cracow (PL); Maciej Witalinski, Jaworzno (PL)

(73) Assignee: Silvair Sp. z o.o., Cracow (PL)

( * ) Notice: Subject to any disclaimer, the term of this patent is extended or adjusted under 35 U.S.C. 154(b) by 162 days.

(21) Appl. No.: 15/524,717

(22) PCT Filed: Nov. 5, 2015

(86) PCT No.: PCT/US2015/059295
§ 371 (c)(1),
(2) Date: May 5, 2017

(87) PCT Pub. No.: WO2016/073757
PCT Pub. Date: May 12, 2016

(65) Prior Publication Data
US 2017/0346318 A1    Nov. 30, 2017

Related U.S. Application Data

(60) Provisional application No. 62/075,288, filed on Nov. 5, 2014.

(51) Int. Cl.
*H02J 7/00*    (2006.01)
*H04L 12/28*    (2006.01)
(Continued)

(52) U.S. Cl.
CPC ............ *H02J 7/0044* (2013.01); *G06Q 10/10* (2013.01); *H02J 7/025* (2013.01); *H02J 50/10* (2016.02);
(Continued)

(58) Field of Classification Search
CPC .......... H02J 7/0044; H02J 50/90; H02J 7/025; H02J 50/10; H04L 12/2816;
(Continued)

(56) References Cited

U.S. PATENT DOCUMENTS 5,923,035 A    7/1999    Winkler
6,993,289 B2 *    1/2006    Janik .................... G06F 1/1632
                                                                      320/107
(Continued)

FOREIGN PATENT DOCUMENTS

EP    2362582 A1    8/2015

OTHER PUBLICATIONS

International Search Report, PCT/US2015/059295.
(Continued)

*Primary Examiner* — Patrice L Winder
(74) *Attorney, Agent, or Firm* — McGeary Cukor LLC; Kenneth Ottesen; Jason Paul DeMont

(57) ABSTRACT

A sensor and control platform includes a smart wall plate and a variety of optional sensor/control elements that removably couple to and interact and communicate with the smart wall plate to enhance the functionality and power of a premises automation system. The smart wall plate contains a plurality of sensors, a microprocessor control unit, and a wireless transceiver. The optional sensor/control elements can be a control dial, a monitoring device, or a camera. The smart wall plate can dictate the functionality of the optional sensor/control elements or the optional sensor/control elements can alter the functionality of the smart wall plate.

19 Claims, 5 Drawing Sheets

(51) Int. Cl.
*H02J 50/90* (2016.01)
*H02J 50/10* (2016.01)
*H02J 7/02* (2016.01)
*G06Q 10/10* (2012.01)

(52) U.S. Cl.
CPC ............ *H02J 50/90* (2016.02); *H04L 12/282* (2013.01); *H04L 12/2816* (2013.01); *H04L 12/2823* (2013.01); *H04L 2012/285* (2013.01); *H04L 2012/2841* (2013.01)

(58) Field of Classification Search
CPC ........... H04L 2012/285; H04L 12/2823; H04L 12/282; H04L 2012/2841; G06Q 10/10
See application file for complete search history.

(56) References Cited

U.S. PATENT DOCUMENTS

| | | | | |
|---|---|---|---|---|
| 7,831,282 | B2* | 11/2010 | Luebke | G06F 3/0362 455/574 |
| 8,250,163 | B2* | 8/2012 | Castaldo | G06F 9/54 340/635 |
| 8,558,179 | B2* | 10/2013 | Filson | G05D 23/1902 250/349 |
| 8,748,745 | B2* | 6/2014 | Imes | H02G 3/16 174/59 |
| 9,251,109 | B2* | 2/2016 | Sharma | G06F 13/385 |
| 9,509,763 | B2* | 11/2016 | Canoy | G06N 99/005 |
| 9,800,429 | B2* | 10/2017 | Crayford | H04L 12/2803 |
| 9,965,007 | B2* | 5/2018 | Amelio | H01R 24/78 |
| 2003/0080296 | A1 | 5/2003 | Raper | |
| 2004/0142601 | A1* | 7/2004 | Luu | H01R 25/006 439/652 |
| 2012/0007555 | A1 | 1/2012 | Bukow | |
| 2012/0061480 | A1* | 3/2012 | Deligiannis | G05B 15/02 236/51 |
| 2012/0136666 | A1 | 5/2012 | Corpier | |
| 2012/0154126 | A1 | 6/2012 | Cohn | |
| 2012/0169482 | A1* | 7/2012 | Chen | G08C 17/02 340/12.52 |
| 2013/0028152 | A1* | 1/2013 | Kim | H04W 88/08 370/310 |
| 2013/0054863 | A1* | 2/2013 | Imes | H04L 12/2827 710/304 |
| 2013/0079903 | A1* | 3/2013 | Kemmann | G05B 15/02 700/83 |
| 2013/0079931 | A1* | 3/2013 | Wanchoo | G01D 4/002 700/278 |
| 2013/0241313 | A1 | 9/2013 | Chirgwin | |
| 2014/0005809 | A1 | 1/2014 | Frei | |
| 2014/0016527 | A1 | 1/2014 | Coffey | |
| 2014/0075075 | A1* | 3/2014 | Morrill | G06F 1/1632 710/303 |
| 2014/0084165 | A1 | 3/2014 | Fadell | |
| 2014/0266669 | A1 | 9/2014 | Fadell | |
| 2015/0057808 | A1* | 2/2015 | Cook | G05B 13/04 700/275 |
| 2016/0156378 | A1* | 6/2016 | Linari | H04M 1/0297 455/575.1 |

OTHER PUBLICATIONS

Written Opinion of the International Searching Authority, PCT/US2015/059295.
International Preliminary Report on Patentability, PCT/US2015/059295.
International Search Report, PCT/IB2015/000528.
Written Opinion of the International Searching Authority, PCT/IB2015/000528.
International Preliminary Report on Patentability, PCT/IB2015/000528.
Non-Final Office Action, U.S. Appl. No. 14/456,552, Notification dated Mar. 8, 2017.
Notice of Allowance, U.S. Appl. No. 14/456,552, dated Dec. 6, 2017.
Examination Report, EP Application No. 15 736 312.8, dated Oct. 12, 2018.

* cited by examiner

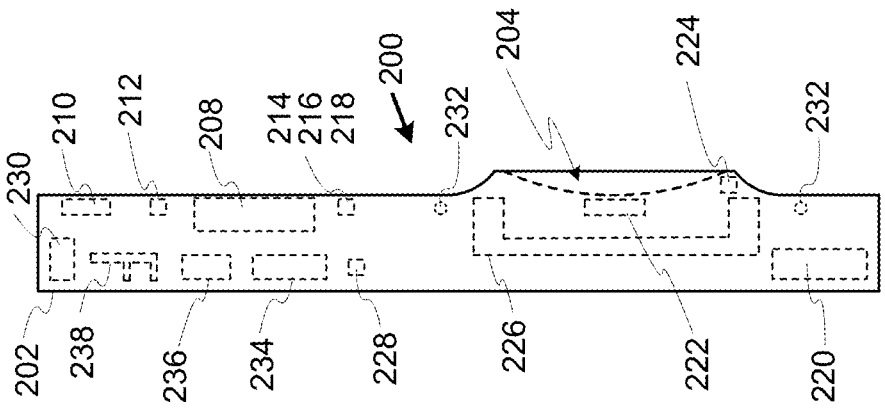
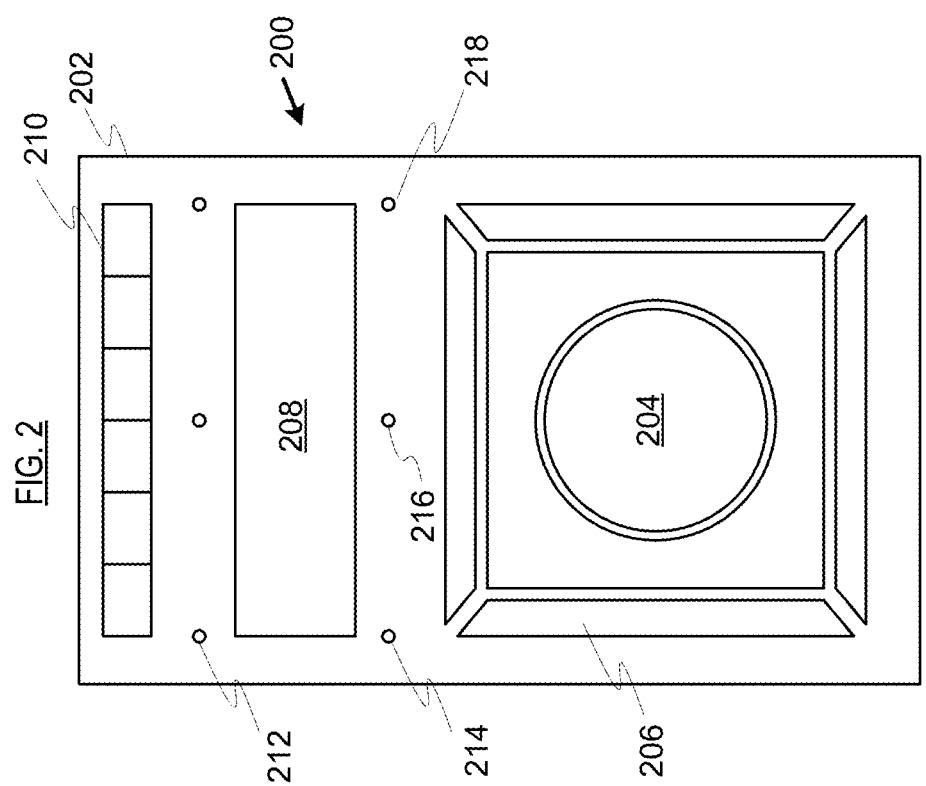

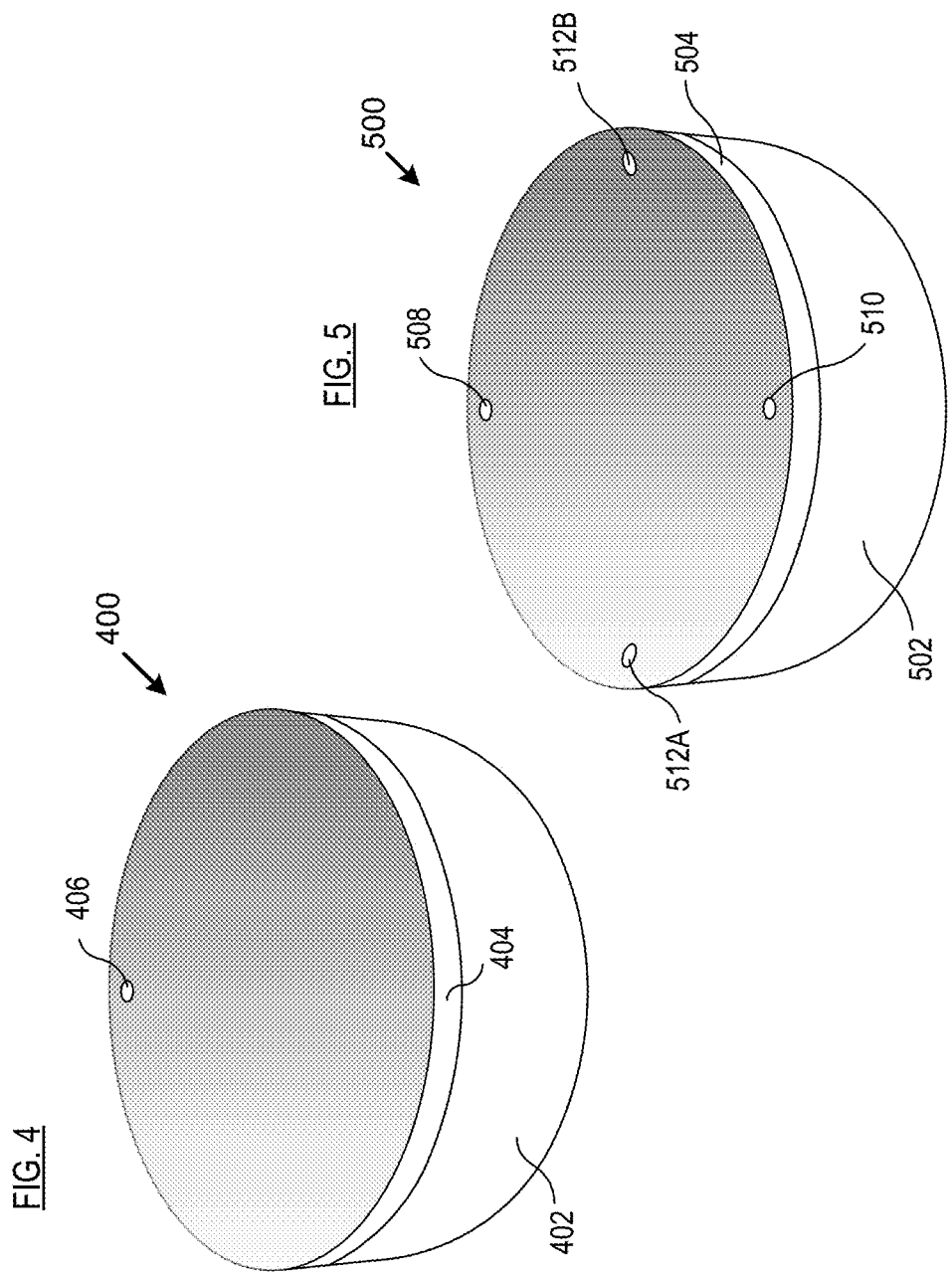

SENSORY AND CONTROL PLATFORM FOR AN AUTOMATION SYSTEM

STATEMENT OF RELATED CASES

This case is related to U.S. patent application Ser. No. 14/456,552 filed Aug. 11, 2014. This case claims priority of U.S. patent application Ser. No. 62/075,288 filed Nov. 5, 2014.

BACKGROUND OF THE INVENTION

Home automation refers to the use of computer and information technology to control home systems, such as lighting, HVAC, audio-visual, smoke detection, security, and shading, among others. Using specialized hardware, even household appliances can be monitored and controlled automatically. A feature of science fiction for many years, home automation has only recently become practical, both from a technological and cost perspective. This is due to the rapid advancement of information technology.

A sophisticated home automation system may include sensors (e.g., temperature, light, motion detection, etc.), controllers (e.g., a general-purpose personal computer or a dedicated automation controller, etc.), and actuators (e.g., motorized valves, switches, etc.).

The system also includes a human-machine interface device that enables a resident of the home to interact with the system. The interface can be a specialized terminal or an application ("app") running on a smart phone or tablet computer. The various system devices communicate over dedicated wiring, or over a wired network, or wirelessly, using one or more protocols.

The sensors that are present in a home automation system typically include one or more of: motion sensors, temperature sensors, light sensors, and air quality sensors. Using such sensors, a home automation system is capable of triggering certain events as a function of sensor readings, such as turning on lights when motion is detected or when ambient light is low, controlling HVAC As more systems within the home become remotely and or autonomously controllable and as integration of such systems with one another proceeds, user interactions with the system can become increasingly problematic. That is, it becomes increasingly difficult to provide the requisite flexibility and control with a simple to use platform.

SUMMARY OF THE INVENTION

The present invention provides a sensory and control platform for a premises (e.g., home, office, etc.) automation system that avoids some of the drawbacks of prior art systems.

In the illustrative embodiment, the sensor and control platform includes a "smart" wall plate and a variety of optional sensor/control elements that can removably couple to and interact and communicate with the smart wall plate to enhance the functionality and power of the premises automation system while remaining simple to use. The optional sensor/control elements include, without limitation, a control dial, a monitoring device, and a camera.

In various scenarios, the smart wall plate can dictate the functionality of the optional sensor/control elements or the optional sensor/control elements can alter the functionality of the smart wall plate.

In the illustrative embodiment, the smart wall plate contains a plurality of sensors, a microprocessor control unit, and a wireless transceiver. The sensors in the smart wall plate are operable to acquire information about the ambient environment and transmit it to the optional sensor/control elements, to a system controller, to other smart wall plates, and/or to automated/controllable systems within the home that are requesting or otherwise can utilize such information. Likewise, the smart wall plate can receive information, including data, commands, etc., from all the forgoing.

In some embodiments, the smart wall plate includes a display, which can be used to present information to users. For example, the information can be menu options that are presented when proximity sensors in the smart wall plate detect the presence of a user's hand. Or the information can be generated by the smart wall plate itself, such as, for example, temperature in the immediate vicinity of the smart wall plate, as measured by a temperature sensor therein. Or the information presented in the display can be received from other parts of the system, such as from a system controller, from external sensors (e.g., an outside temperature measurement, etc.), or from the optional sensor/control elements, other smart wall plates, or other automated/controllable systems within the home/premises.

The smart wall plate can be powered via a non-rechargeable battery, a rechargeable battery (including optional energy-harvesting capability), or a line-voltage driven transformer.

In the illustrative embodiment, the optional sensor/control elements magnetically couple to the smart wall plate via a magnetic mount. In the illustrative embodiment, the optional sensor/control elements communicate with the smart wall plate via near-field communications technology.

In some embodiments, the functionality of the smart wall plate can change by virtue of the presence or absence of an optional sensor/control element. For example, if no optional sensor/control element is coupled to the smart wall plate, the smart wall plate can function as a simple switch, which can actuated by touching the surface that the optional sensor/control element would otherwise couple to.

BRIEF DESCRIPTION OF THE DRAWINGS

FIG. 2 depicts a front view of smart wall plate 200 of sensory and control platform 100 in accordance with an illustrative embodiment of the present invention.

FIG. 3 depicts a notional component layout for smart wall plate 200 of FIG. 2.

FIG. 4 depicts a control dial for use in conjunction with smart wall plate 200.

FIG. 5 depicts a monitoring device for use in conjunction with smart wall plate 200.

DETAILED DESCRIPTION

Definitions

The following terms and phrases, and inflected forms thereof, are defined for use in this disclosure and the appended claims:

"actor" refers to a device or system that can affect its environment and whose state or operation can be changed, wherein the results of the change are predictable. A non-exclusive list of actors relevant to a home automation system include lighting, HVAC, window shades, a home entertainment system, door locks, smart appliances, and the like. To implement a change-in-state in automated fashion, the actor must possess or be operatively coupled to appropriate hardware (e.g., telecommunications receiver, processor, actuator, etc.) and software (e.g., for interpreting a request/command, generating a control signal for the actuator, etc.). Any actor used in conjunction with a premises automation system in accordance with the present teachings includes the aforementioned appropriate hardware/software.

"ambient conditions" means any physical condition of the ambient environment, such as temperature, air quality, time, etc.

"associate" when used to refer to a relationship between a sensor/control device and an actor, means that the device and the actor communicate with one another, exchanging reports/commands/requests.

Figure 1:
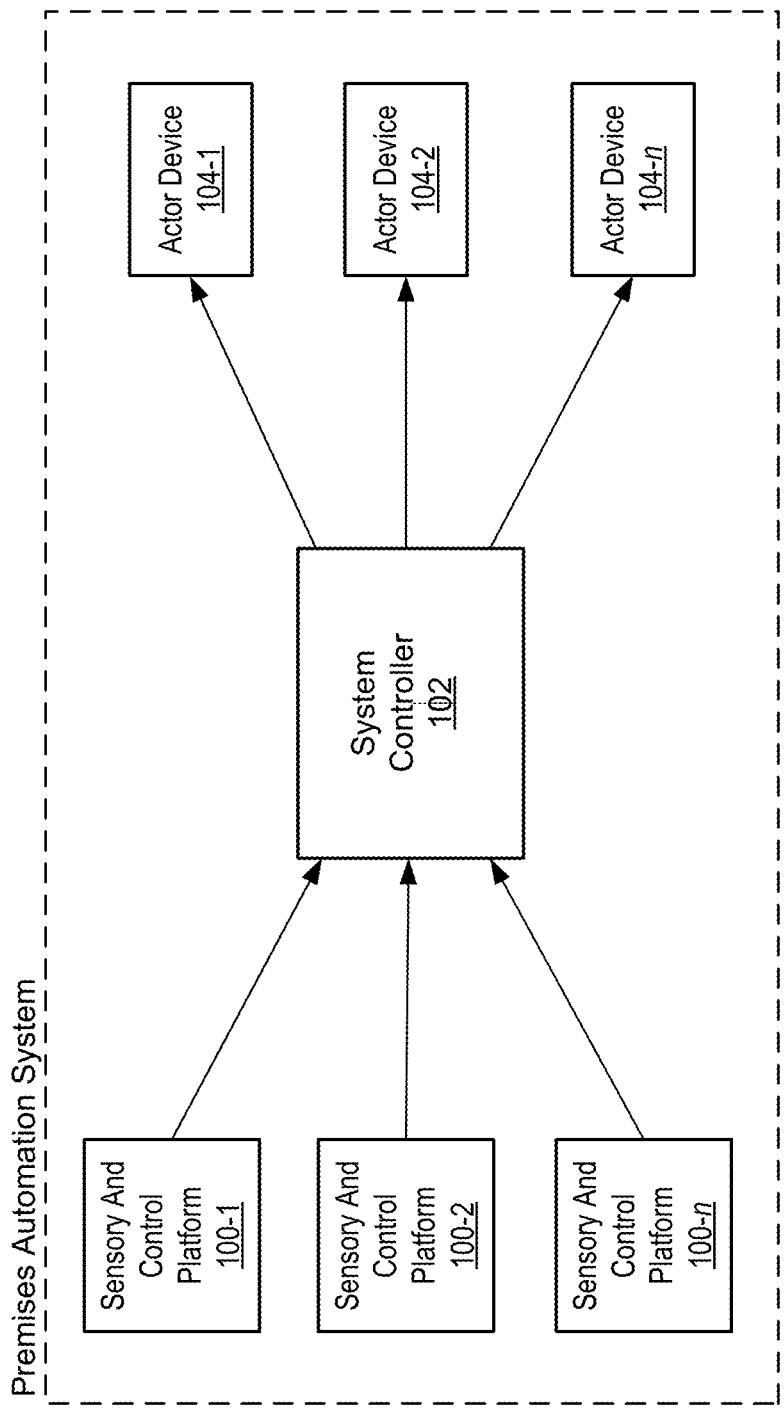
FIG. 1 depicts a premises automation system sensory including sensory and control platform 100.

FIG. 1 depicts a premises automation system, which comprises sensory and control platform "SCP" 100-$i$, where $i$ is a positive integer from 1 to M, system controller 102, and actor devices ("actors") 104-$i$, where i is a positive integer from 1 to N. The aforementioned elements are interrelated as shown.

SCP 100-$i$ (hereinafter generically "SCP 100") is a group of one or more components that obtain and provide sensory input information and user input information to the premises automation system as well as providing information output to a user. The components of SCP 100 are described further below in conjunction with FIGS. 2-7.

The information obtained by SCP 100 can be used to request a change of state in actor 104-$i$ (hereinafter generically "actor 104") or report information relevant to determining whether such a change is necessary or otherwise desirable. In some embodiments, SCP 100 performs relatively minimal processing of the data obtained by its sensors or from a user (i.e., performs processing sufficient to simply transmit raw data). In some other embodiments, SCP 100 performs relatively more extensive processing of the raw sensor or user-input data. For example, in some such embodiments, SCP 100 fuses data from multiple sources and reports information that pertains to the results of the fusion, and/or evaluates the fused data and determines a desired/required change of state based thereon, etc.

In the illustrative embodiment depicted in FIG. 1, a request or report from SCP 100 is transmitted to system controller 102. System controller 102 is a data processing apparatus having wireless and wired telecommunications capabilities, including a variety of input/output ports (e.g., Ethernet, etc.).

In the illustrative premises automation system depicted in FIG. 1, system controller 102 functions as an intermediary between the SCPs 100 and actors 106, coordinating the actions to be taken by the actors based on signals received from one or more SCPs 100. The system controller also maintains in memory the states of various processing events (e.g., predetermined sequences of various input signal values, the time since a last instance of a predetermined input signal value was received, other events reported by SCPs 100, etc.).

Actor 104 is an apparatus that takes certain actions based on signals originating from one or more SCPs 100, as processed by system controller 102 (in the embodiment depicted in FIG. 1). Actor 104 is operatively coupled to communications components, a processor/memory, and an actuator (not shown), so that it can respond to commands. These components can be distinct from actor 104 or the actor can incorporate one or more of such components. In operation, the communications component associated with actor 104 will receive a message from system controller 102 directing the particular actor to change its state. In some embodiments, the processor/memory associated with actor 104 generates a control signal based on the received message and transmits the control signal to an associated actuator. The actuator responds to the control signal, making the required change in the actor.

As those who are skilled in the art will appreciate in light of this disclosure, an actor can be any of a variety of devices, such as a light bulb as part of a lighting system, a media player as part of an audio/video system, a heater as part of an environmental control system, an outgoing-email server as part of a messaging system, a controller in a water sprinkler system, a robot or robotic arm, a pan/tilt camera, a switch, a motor, a servo mechanism, and so forth.

In some other embodiments, SCPs 100 communicate directly with actors 104. That is, rather than (or in addition to) communicating with actors 104 through an intermediary—system controller 102—SCPs 100 have the ability to communicate directly with actors 104 in peer-to-peer fashion. In embodiments in which system controller 102 is not present, the functionality that would otherwise be provided by system controller 102 is distributed among SCPs 100 and/or actors 104, and/or other elements associated with the actors. In yet some further embodiments, the functionality of system controller 102 can be migrated to the "Cloud."

SCP 100 includes a main component and several optional components. The main component is smart wall plate 200, which is depicted in FIGS. 2 and 3. The smart wall plate is an "active" wireless device; that is, it contains sensors, a wireless transceiver with antenna, and a microprocessor control unit. The sensors acquire information about the ambient environment, the wireless transceiver receives information (e.g., data, commands, etc.) from the optional components and/or transmits information to such optional components, and/or to other smart wall plates 200, and/or to a system controller 102, and/or to actors 104 for acquiring information or requesting a change of state.

FIG. 2 depicts a front view of smart wall plate 200. FIG. 3 depicts a notional component layout for the smart wall plate. Externally visible elements of smart wall plate 200, as depicted in FIG. 2, include housing 202, receiving region 204, touch sliders 206, display 208, photovoltaic energy-harvesting module 210, proximity sensors 212, temperature sensor 214, ambient light sensor 216, and humidity sensor 218.

Receiving region 204 receives optional sensor/control devices. The receiving region 204 has a shape (e.g., hemispherical, etc.) that is complementary to the exterior surface of the optional sensor/control devices. In some embodiments, receiving region 204 is touch-sensitive, such as by disposing one or more touch electrodes (not depicted) beneath the receiving region. This enables smart wall plate 200 to capture "tap" gestures of a user, which can be interpreted to turn a light "on" or "off," etc. Alternatively, receiving region 204 can be a touch pad, enabling capture of single or even multi-finger gestures.

As depicted in FIG. 3, magnet 222 is disposed beneath receiving region 204. The magnet holds the optional sensor/control device in place in the receiving region. Magnetic sensor 224 is disposed near receiving region 204. The magnetic sensor is operable to detect whether an optional sensor/control device is in place in receiving region 204. This is accomplished by detecting a change in a magnet field generated by magnet 222, as occasioned by the presence of a magnet within the optional sensor/control device. Magnetic sensor 224 can be, for example, a hall-effect sensor or a reed sensor.

Charging coils 226 are disposed beneath receiving region 204. The charging coils can be used to wirelessly recharge the optional sensor/control device. The transfer of energy is effected via a matching coil within the optional sensor/control device, in known fashion.

Sliders 206 surround receiving region 204. The sliders are touch sensitive; that is, sliding a finger along one of sliders 206 enables a user to control various system functions, such as dimming lights, color selection of lights, temperature, sound volume, etc. The functions of sliders 206 are software-defined. The system can be configured so that, in response to a finger sliding along one of sliders 206, smart wall plate 200 issues a command directly to an actor 104 (e.g., command a light bulb to decrease intensity, etc.). Alternatively, the system can be configured so that in response to a finger sliding along one of sliders 206, smart wall plate 200 transmits a signal to system controller 102, wherein the system controller interprets the signal and decides, based on its programming, etc., how to react to it.

Power source 220 is any component—a battery, super capacitor, etc.—capable of storing energy for powering certain elements of smart wall plate 200. In some embodiments, power source 220 is user replaceable. In some other embodiments, power source 220 is rechargeable, such as via energy harvesting units or from an optional power supply (not depicted) that can be hardwired to the premises electrical system and connect to smart wall plate 200 via power contacts (not depicted).

The smart wall plate is designed as a flat object for placement on a wall (or a window). But smart wall plate 200 will often replace existing standard wall switches. In such a situation, the smart wall plate will cover the opening in the wall occasioned by the presence of the standard switch. There will be mains power running to that location (for the switch) and, in the absence of the switch, there will be room to include a power supply unit (e.g., a transformer). The presence of the power supply will enable options such as wireless charging of the optional sensor/control devices and the use of light emitting displays (e.g., LED, OLED, LCD, etc.).

With respect to energy harvesting, in some embodiments, smart wall plate 200 includes photovoltaic energy-harvesting component 210. This energy-harvesting component is a photovoltaic cell, which is a semiconductor element that generates electricity from light. In some embodiments, smart wall plate 200 includes Peltier-based energy-harvesting component 230. The Peltier-based component utilizes a Peltier junction, which is a semiconductor element that generates electricity based on a temperature difference between the two sides of the junction. Since smart wall plate 200 will typically be attached to a wall, it is likely that the portion touching the wall will have different temperature than the part facing the room. Energy can thereby be generated based on that temperature difference. In some embodiments, the energy generated by energy-harvesting components 210 and/or 230 can be stored in power source 220.

Display 208 is used to provide information to users. The information can be generated via smart wall plate 200. For example, the information can be, for example, menu options that are presented when proximity sensors 212 detect the presence of a hand. Or the information can be a temperature, as measured by temperature sensor 214. Or the information can be received from other parts of the system, such as from system controller 102, from external sensors (e.g., an outside temperature measurement, etc.), or from optional sensor/control devices that are coupled to receiving region 204.

In some embodiments, display 208 is touch sensitive, enabling direct human interaction with the user interface. The technology of the display can differ based, for example, on the power option. When smart wall plate 200 is battery powered or relies on energy harvesting, an electronic-ink display is preferable due its low power draw. For a mains-powered smart wall plate, the power budget for the display will not be a concern. This permits a greater number of displays to be considered for use, such as LED, OLED, and LCD to name a few.

As previously noted, in various embodiments, smart wall plate 200 includes one or more environmental sensors, such as proximity sensor 212, temperature sensor 214, ambient light sensor 216, and humidity sensor 218.

In some embodiments, proximity sensors 212 include one near-infrared sensing element and several (typically 1 to 3) near-infrared emitters. The emitters send very short pulses of IR light that can be reflected by nearby objects, such as a user's hand. The sensing element measures the reflected beam and reports a relative distance of the reflecting object. By using an array of more than one emitter, a direction of movement of the object can be determined. Two emitters can, for example, detect one-dimensional movements, such as moving a hand laterally or vertically (but not both). Three emitters can detect two-dimensional movements such as both lateral and vertical movements.

Proximity sensors 212 are particular useful in the context of power management. Most of the components of smart wall plate 200 can be in a power-down/sleep/dormant state until movement is detected by the proximity sensor, at which point they are awakened. In addition to or as an alternative to using proximity detectors 212 for power management, smart wall 200 can respond to wake-up events such as a change of ambient light as determined by ambient light sensor 216 or placement/removal of the optional sensor/control device. Additionally, timers can of course be used for component wake-up.

Accelerometer 228 reports the mounting orientation (horizontal or vertical) of smart wall plate 200, which influences how display 208 is addressed. Furthermore, accelerometer 228 is an aid to alignment during mounting and can serve a security function, since it will report motion.

Microprocessor controller unit 234 manages all functions of smart wall plate 200, including sensor operation, power management, and communications. The microprocessor controller unit includes a microprocessor as well as storage and program-execution memory. Unit 234 runs software for communicating with actors 104 in peer-to-peer fashion or can run software for communicating with system controller 102.

Wireless transceiver 236 and antenna 238 enable communications with other system components, such as other smart wall plates 200, sensors, system controller(s) 102, actors 104, and mobile stations (such as cell phones, etc.). In some embodiments, wireless transceiver 236 uses Bluetooth Smart, which enables smart wall plates 200 to be configured from a smart phone. In other embodiments, other radio standards can be used.

Near Field Communications ("NFC") reader includes NFC reader coils 232. The coils are used to read passive NFC tags that, in some embodiments, are situated in the optional sensor/control devices. This enables smart wall plate 200 to detect which particular optional sensor/control device is placed in receiving region 204 and then to act accordingly. This is discussed in further detail below in conjunction with FIG. 4.

FIG. 4 depicts control dial 400, which is one of the optional sensor/control devices for use in conjunction with smart wall plate 200. Control dial 400 directs the behavior of smart wall plate 200. Control dial 400 includes housing or body 402 and cap 404. In some embodiments, body 402 is anodized aluminum and cap 404 is plastic. Indicator 406 indicates rotation of the dial. Control dial 400 includes a microprocessor, memory, and passive NFC tag (not depicted). The lower portion of body 402 is shaped to facilitate coupling with receiving region 204 of smart wall plate 200. The control dial is programmed to operate in a certain fashion and to cause smart wall plate 200 to operate in a certain fashion.

For example, control dial 400 can be programmed for "music" or "lighting". In the former case, when control dial 400 is situated in receiving region 204 of smart wall plate 200, music-related information is displayed in display 208. In some embodiments, a menu appears that enables a user to select a genre of music, an artist, a song, etc. Menu selection can be implemented by rotating control dial 400. Alternatively, in embodiments in which display 208 is a touch display, the user can simply touch the display to make a selection. When programmed for lighting and with control dial 400 situated in receiving region 204, lighting-related information will appear in display 208.

FIG. 5 depicts monitoring device 500, which is another of the optional sensor/control devices for use in conjunction with smart wall plate 200. The monitoring device includes a housing or body 502 and cap 504. In some embodiments, body 502 is anodized aluminum and cap 504 is plastic. In the illustrative embodiment depicted in FIG. 5, the top surface of cap 504 includes windows 508, 510, 512A, and 512B. Windows 510, 512A, and 512B are used in conjunction with an active proximity sensor system. An RGB indicator light is disposed below window 508. The lower portion of body 502 is shaped to facilitate coupling with receiving region 204 of smart wall plate 200.

Monitoring device 500, when placed in receiving region 204 of a smart wall plate, can provide functionality similar to that of control dial 400. In addition, monitoring device 500 has substantial functionality apart from any collaboration with smart wall plate 200. For example, monitoring device 500 is capable of acquiring and providing information about itself or its environment to system controller 102 or directly to actors 104. Thus, in some embodiments, smart wall plate 200 simply functions as a wireless charger for monitoring device 500. With respect to wireless charging, as previously noted, smart wall plate 200 includes inductive charging circuitry 226 and monitoring device 500 is likewise appropriately configured (e.g., an induction coil, etc.), as is within the capabilities of those skilled in the art.

In some other embodiments, smart wall plate 200 dictates the functionality of monitoring device 500 by, for example, dictating with which of several actors monitoring device 500 is intended to associate. In some embodiments, when a monitoring device 500 is placed in receiving region 204, a menu is displayed that gives the user a choice of designating the functionality of the monitoring device (e.g., to function as a lighting control, entertainment system controller, etc.). Thus, smart wall plate 200 can be used to program (or re-program) a monitoring device 500.

Figure 6:
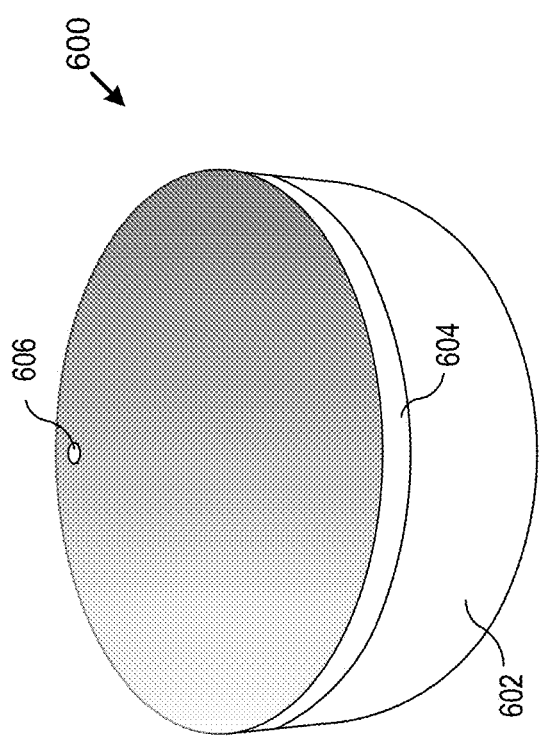
FIG. 6 depicts a camera for use in conjunction with smart wall plate 200.

FIG. 6 depicts camera 600, which is another of the optional sensor/control devices for use in conjunction with smart wall plate 200. Camera 600 includes a housing or body 602 and cap 604. In some embodiments, body 602 is anodized aluminum and cap 604 is plastic. The top surface of cap 604 includes window 606. A camera is disposed below window 606. The lower portion of body 602 is shaped to facilitate coupling with receiving region 204 of smart wall plate 200.

Camera 600 includes a microprocessor and wireless telecommunications capabilities for transferring raw or processed video data to smart wall plate 200 or system controller 102. The smart wall plate functions as a support for camera 600 (rather than having to separately mount camera 600 to a fixed location on a wall). To the extent that other smart wall plates are present in the premises automation system, camera 600 can be moved from one to the next as desired. Furthermore, in some embodiments, smart wall plate 200 can function as a charger for camera 600.

Figure 7:
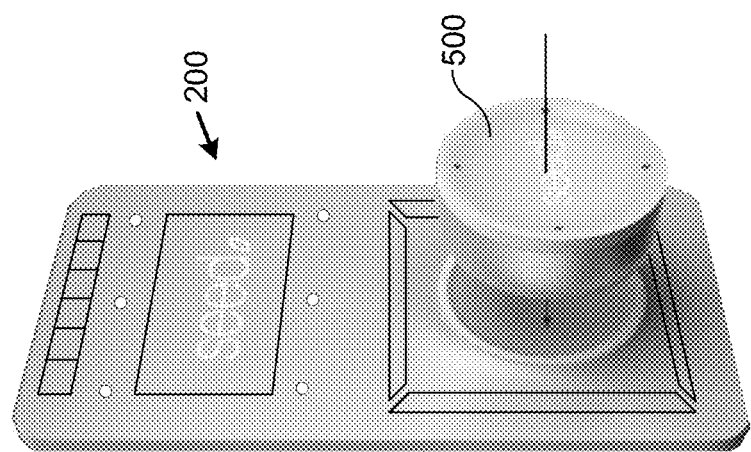
FIG. 7 depicts sensory and control platform 100 wherein monitoring device 500 is magnetically coupling to smart wall plate 200.

FIG. 7 depicts an embodiment of sensory and control platform 100, wherein monitoring device 500 is about to couple to receiving region 204 of smart wall plate 200.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A sensory and control platform for a premises automation system, comprising a first smart wall plate, wherein the first smart wall plate includes:
   a receiving region configured to receive a removably couple-able optional sensor/control device, wherein the receiving region has a shape that is complementary to an exterior surface of the optional sensor/control device;
   a first detector configured to detect the presence of the optional sensor/control device;
   a wireless transceiver configured to communicate with other elements of the premises automation system;
   near-field communications (NFC) reader coils configured to read an NFC tag situated within the optional sensor/control device; and
   a display configured to display information read by the NFC reader coils, if the optional sensor/control device is coupled to the receiving region as detected by the first detector.

2. The sensory and control platform of claim 1 further comprising:
   a plurality of sensors configured to sense ambient conditions; and
   a second detector configured to detect the presence of a user.

3. The sensory and control platform of claim 1 further comprising the optional sensor/control device.

4. The sensory and control platform of claim 3 wherein the optional sensor/control device is a control dial, wherein the control dial is operable, in conjunction with a user, to dictate the functionality of the first smart wall plate.

5. The sensory and control platform of claim 3 wherein the optional sensor/control device is a monitoring device, wherein the monitoring device provides the following functionality:
   (i) dictates the functionality of the first smart wall plate;
   (ii) acquires information about itself;

(iii) acquires information about its ambient environment; and (iv) provides the information acquired in (ii) and (iii) to a system controller of the premises automation system or directly to actors.

6. The sensory and control platform of claim 3 wherein the optional sensor/control device is a monitoring device, wherein the first smart wall plate dictates the functionality of the monitoring device by dictating with which of several actors the monitoring device is intended to associate.

7. The sensory and control platform of claim 3 wherein the optional sensor/control device is a monitoring device, wherein, when the monitoring device is placed in the receiving region, a menu is displayed in the display, wherein the menu provides several different user-selectable functionalities that are assignable to the monitoring device.

8. The sensory and control platform of claim 7 wherein menu options are selected by rotating the monitoring device in plane while the monitoring device is coupled to the receiving region.

9. The sensory and control platform of claim 3 wherein the optional sensor/control device is a camera, wherein the camera includes a microprocessor and wireless telecommunications capabilities.

10. The sensory and control platform of claim 3 further comprising a second smart wall plate, wherein the optional sensor/control device is movable between and removably couple-able to each of the first smart wall plate and the second smart wall plate.

11. The sensory and control platform of claim 1 wherein the first smart wall plate further comprises a magnet disposed proximal to the receiving region for removably coupling the optional sensor/control device to the receiving region.

12. The sensory and control platform of claim 1 wherein the first smart wall plate further comprises an energy harvesting component that generates electricity based on a temperature difference between i) a side of the first smart wall plate touching a wall and ii) a side of the first smart wall plate facing a room.

13. The sensory and control platform of claim 1 wherein the optional sensor/control device comprises a body and a cap, wherein the body comprises anodized aluminum and the cap comprises plastic.

14. A sensory and control platform for a premises automation system, comprising a smart wall plate, wherein the smart wall plate includes:
a receiving region configured to receive a removably couple-able optional sensor/control device;
a detector configured to detect the presence of the optional sensor/control device;
near-field communications (NFC) reader coils configured to read an NFC tag situated within the optional sensor/control device;
a control unit for determining, based on the NFC tag read by the NFC reader coils, which particular optional sensor/control device is placed in the receiving region, wherein the particular optional sensor/control device dictates the functionality of the smart wall plate; and
a display configured to display information read by the NFC reader coils.

15. The sensory and control platform of claim 14 further comprising the optional sensor/control device, wherein the optional sensor/control device is a control dial, and wherein the control dial is operable, in conjunction with a user, to dictate the functionality of the smart wall plate.

16. The sensory and control platform of claim 14 further comprising the optional sensor/control device, wherein the optional sensor/control device is a monitoring device, and wherein the smart wall plate dictates the functionality of the monitoring device by dictating with which of several actors the monitoring device is intended to associate.

17. A sensory and control platform for a premises automation system, comprising a smart wall plate, wherein the smart wall plate includes:
a receiving region configured to receive a removably couple-able optional sensor/control device, wherein the receiving region comprises a touch-sensitive surface;
a detector configured to detect the presence of the optional sensor/control device;
near-field communications (NFC) reader coils configured to read an NFC tag situated within the optional sensor/control device; and
a control unit for determining, based on the NFC tag read by the NFC reader coils, which particular optional sensor/control device, if any, is placed in the receiving region, wherein the particular optional sensor/control device, if so placed, dictates the functionality of the smart wall plate;
wherein the smart wall plate functions as a switch if no optional sensor/control device is coupled to the smart wall plate, and wherein the switch is actuated by a user touching the touch-sensitive surface of the receiving region that the optional sensor/control device would otherwise couple to.

18. The sensory and control platform of claim 17 further comprising the optional sensor/control device, wherein the optional sensor/control device is a control dial, and wherein the control dial is operable, in conjunction with a user, to dictate the functionality of the smart wall plate.

19. The sensory and control platform of claim 17 further comprising the optional sensor/control device, wherein the optional sensor/control device is a monitoring device, and wherein the smart wall plate dictates the functionality of the monitoring device by dictating with which of several actors the monitoring device is intended to associate.

* * * * *